United States Patent [19]

Baer

[11] Patent Number: 4,528,976
[45] Date of Patent: Jul. 16, 1985

[54] THERMAL CONTROL SYSTEM FOR SOLAR COLLECTOR

[75] Inventor: Stephen C. Baer, Albuquerque, N. Mex.

[73] Assignee: Zomeworks Corporation, Albuquerque, N. Mex.

[21] Appl. No.: 617,762

[22] Filed: Jun. 6, 1984

[51] Int. Cl.[3] .................................................. F24J 3/02
[52] U.S. Cl. .................................... 126/422; 126/434; 126/432
[58] Field of Search ............... 126/419, 422, 437, 432, 126/434

[56] References Cited

U.S. PATENT DOCUMENTS

| | | | |
|---|---|---|---|
| 4,102,325 | 7/1978 | Cummings | 126/419 |
| 4,147,157 | 4/1979 | Zakhariya | 126/419 |
| 4,212,287 | 7/1980 | Dougherty et al. | 126/419 |
| 4,399,807 | 8/1983 | Buckley et al. | 126/419 X |

FOREIGN PATENT DOCUMENTS 23764  2/1982  Japan .................... 126/434

Primary Examiner—Larry Jones
Attorney, Agent, or Firm—Townsend and Townsend

[57] ABSTRACT

A fluid cycling system for a solar collector is disclosed. The collector has a pump to force fluid through the collector to a fluid exit. The present invention provides a vertically extending expansion tank with an inlet coupled to the fluid exit from the collector located intermediate the top and bottom of the expansion tank. A primary outlet is provided below the tank, and a secondary outlet above the primary outlet. A return conduit couples the primary outlet to the pump. A radiator couples the secondary outlet to an intermediate portion of the return conduit. A fluid occupies the solar collector and the return conduit, and has a liquid volume so that in the absence of solar input to the collector the level of liquid in the tank is below the inlet. At approximately the maximum safe operating temperature, the liquid volume reaches the secondary outlet in the tank so that a portion of the liquid passes through the radiator to dissipate heat and prevent the temperature of the fluid from exceeding the maximum safe operating temperature.

11 Claims, 4 Drawing Figures

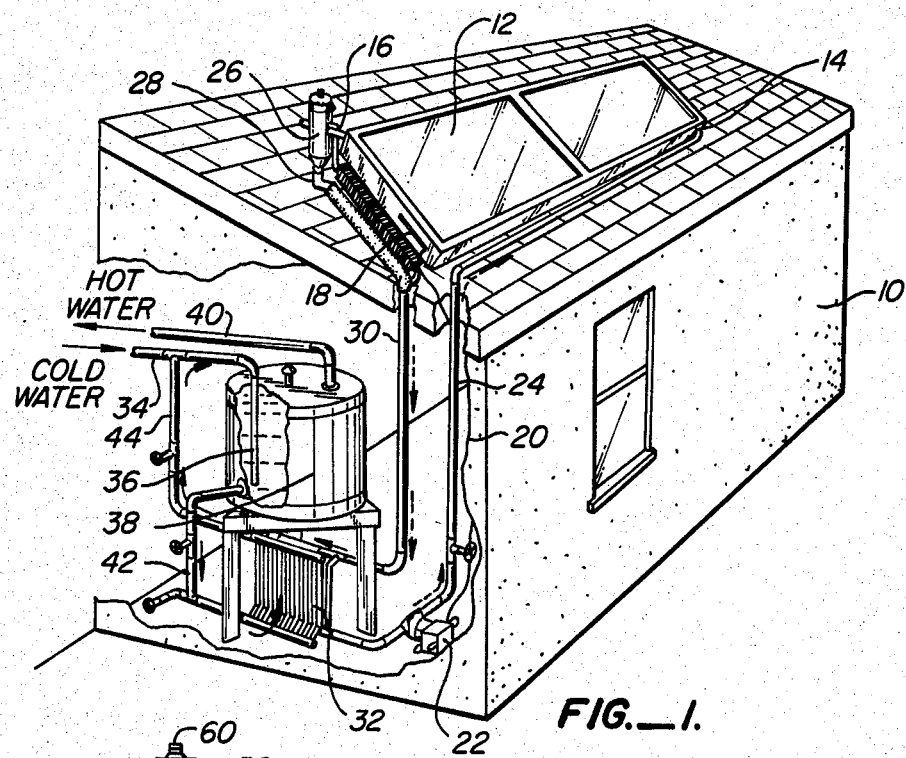
FIG._1.
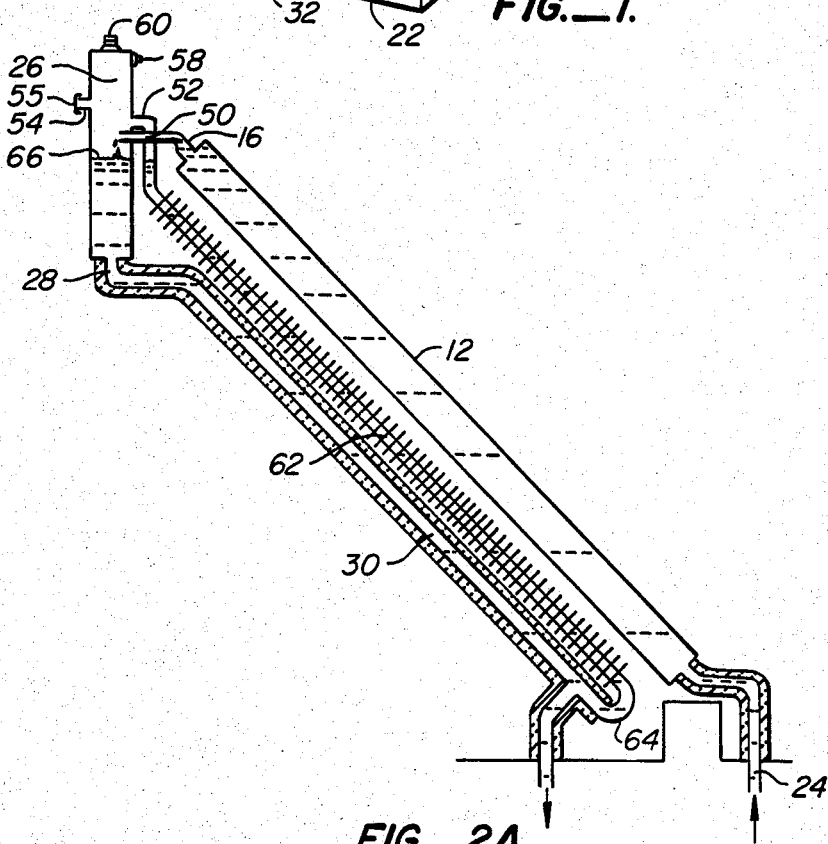
FIG._2A.

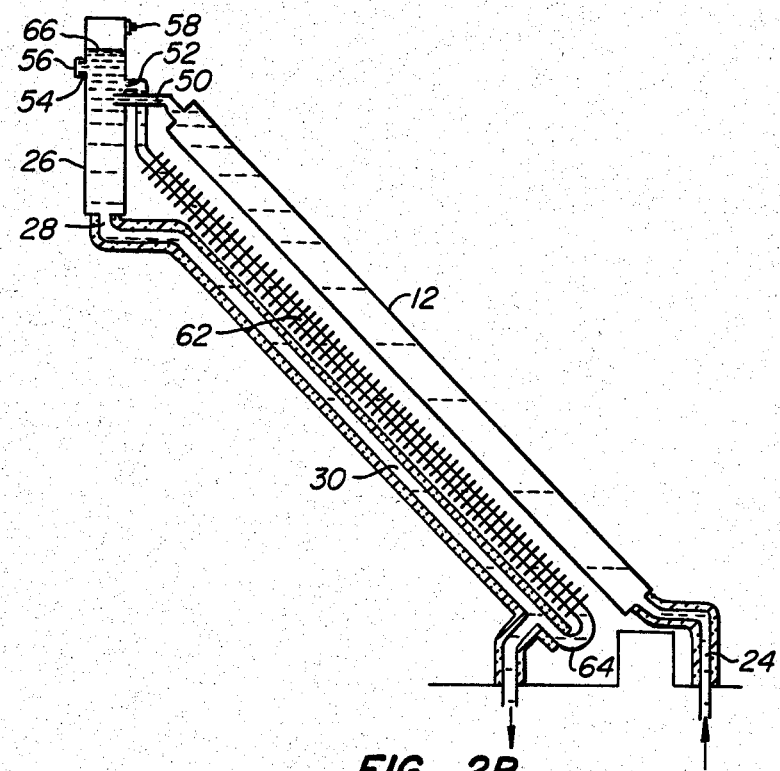
FIG._2B.
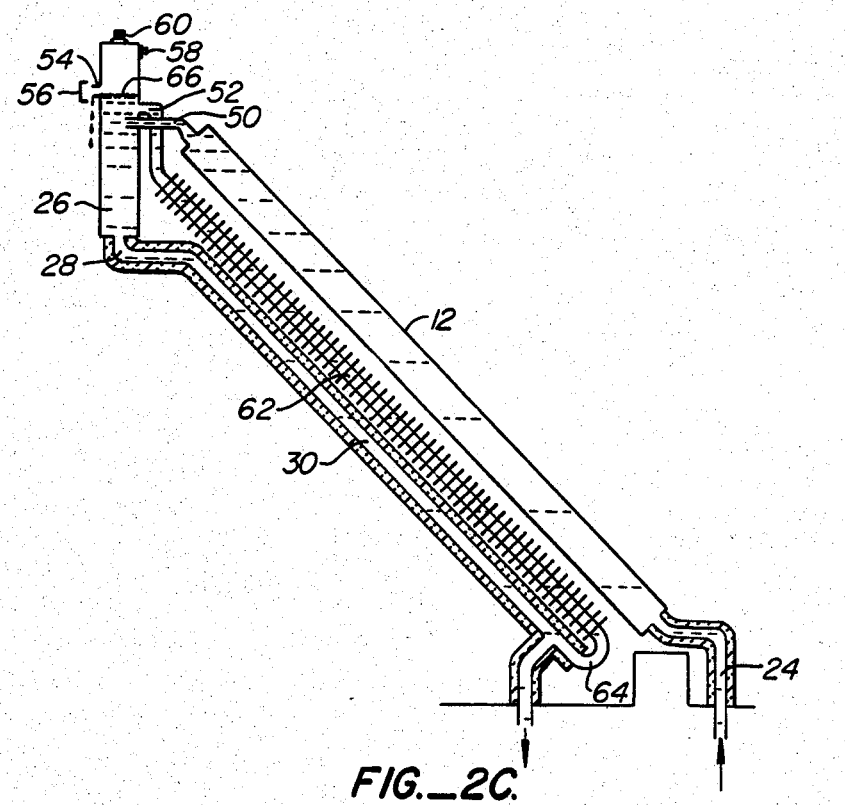
FIG._2C.

THERMAL CONTROL SYSTEM FOR SOLAR COLLECTOR

BACKGROUND OF THE INVENTION

The present invention relates to a system for controlling the flow and temperature of a fluid in an indirect type of solar collector.

Indirect solar collectors cycle a collector fluid such as antifreeze through a closed loop including the collector itself and a heat exchanger. The heat exchanger is used to heat a second fluid or element, often water which is stored in a hot water tank. An expansion tank and pressure relief valve are incorporated in the closed loop to accommodate fluid expansion and vaporization. An air vent is usually included as well to accommodate underpressure.

Indirect solar collectors are subject to overheating in several respects. During periods of low usage, the collector fluid will undergo little heat loss at the heat exchanger, causing the temperature and thus the vapor pressure of the collector fluid to rise. When the collector fluid reaches the pressure necessary to actuate the pressure relief valve, the collector fluid will be lost through the relief valve and insufficient fluid will remain to operate the system efficiently when use level increases. The collector fluid may also become corrosive when excessively heated and damage the collector and other system componenets. During periods of moderate usage, but above average sunlight, the second fluid may become overheated. When water is the second fluid, excessive heating damages the liner of the hot water storage tank, and shortens its useful life. Pump failure may cause the collector fluid in the collector itself to be overheated and damage the collector. To avoid overheating, indirect solar collectors typically have complex and expensive active cooling systems which are electronically controlled, and in large measure defeat the desired simplicity of the system.

SUMMARY OF THE INVENTION

The present invention provides a fluid cycling system for a solar collector. The collector has a pump to force fluid through the collector to a fluid exit. The present invention provides a vertically extending expansion tank with an inlet coupled to the fluid exit from the collector located intermediate the top and bottom of the expansion tank. A primary outlet is provided below the tank, and a secondary outlet above the primary outlet. A return conduit couples the primary outlet to the pump. A radiator couples the secondary outlet to an intermediate portion of the return conduit. A fluid occupies the solar collector and the return conduit, and has a liquid volume so that in the absence of solar input to the collector the level of liquid in the tank is below the inlet. At approximately the maximum safe operating temperature, the liquid volume reaches the secondary outlet in the tank so that a portion of the liquid passes through the radiator to dissipate heat and prevent the temperature of the fluid from exceeding the maximum safe operating temperature.

The present invention provides overheat protection without the use of the complex electronic controls found in prior art systems. An increase in temperature of the fluid to the maximum safe operating temperature merely results in a portion of the liquid flowing through the radiator to compensate for lack of cooling at the heat exchanger. It is preferred that the radiator be provided with a trap so that the cool radiator fluid does not enter the return conduit unless an overheat condition exists and hot fluid is flowing into the radiator.

In the preferred embodiment of the invention the secondary outlet is slightly above the inlet to the expansion tank. If the pump fails, the liquid level in the expansion tank will reach the inlet before it reaches the secondary outlet to the radiator. This provides a continuous liquid path so that the fluid will migrate slowly through the system through the disabled pump. The fluid will thus cycle through the collector and excess heat will be distributed throughout the entire collector fluid volume.

The novel features which are characteristic of the invention, as to organization and method of operation, together with further objects and advantages thereof will be better understood from the following description considered in connection with the accompanying drawings in which a preferred embodiment of the invention is illustrated by way of example. It is to be expressly understood, however, that the drawings are for the purpose of illustration and description only and are not intended as a definition of the limits of the invention.

BRIEF DESCRIPTION OF THE DRAWINGS

FIG. 1 is a perspective view of a solar heated water installation incorporating the preferred embodiment of the present invention;

FIGS. 2A-C are fragmentary schematic sectional views illustrating the operation of the preferred embodiment of the present invention.

DESCRIPTION OF THE PREFERRED EMBODIMENT

A building structure 10 with a solar heating system incorporating the preferred embodiment of the present invention is illustrated generally by way of reference to FIG. 1. A conventional solar collector 12 is located on the roof of the structure and oriented toward the sun. Collector 12 has a fluid entrance 14 at the bottom of one end and a fluid exit 16 at the top of the other end. A photovoltaic panel 18 is located next to collector 12, and is coupled by wires 20 to a pump 22 within the structure. Pump 22 forces the collector fluid, usually an antifreeze, through a conduit 24 to collector entrance 14. The fluid is forced upwardly through collector 12, so that it has maximum exposure to the sun before leaving the collector at exit 16. Photovoltaic panel 18 will generate electricity as long as sunlight is present, and thus the fluid is circulated continuously when sunlight is present, and is generally stagnant in the absence of sunlight.

After the collector fluid leaves collector 12 through exit 16, it enters an expansion tank 26, which will be illustrated in more detail hereinafter. Expansion tank 26 has a primary outlet 28 at the bottom of the expansion tank, coupled to a return conduit 30. The collector fluid, heated in the solar collector, passes through the return conduit 30 to a heat exchanger 32, and back to conduit 24 to reinitiate the cycle.

Cold water from a water main or other source is supplied through pipe 34 to a dip tube 36 which extends to near the bottom of a hot water storage tank 38. A conduit 42 runs from a port near the bottom of hot water storage tank 38 to heat exchanger 32, so that cold water from the bottom of the storage tank is heated by exchanging heat with the collector fluid. A conduit 44 carries the water heated in the heat exchanger back to cold water inlet pipe 34. Hot water is drawn from the top of storage tank 38 through pipe 40 as needed by the occupants of structure 10, and a removal of a portion of the hot water from the storage tank creates a vacuum which draws water from pipe 34 into the tank. The heated water plus an amount of cold water will enter hot water storage tank 38 as hot water is drawn from the top of the tank through pipe 40.

As illustrated in more detail by way of reference to FIG. 2A, expansion tank 26 is a relatively large diameter pipe oriented vertically so that the vertical dimension of the tank is larger than its horizontal dimension. Expansion tank 26 has an inlet port 50 communicating with the fluid exit 16 of collector 12. Primary outlet 28 is located at the bottom of tank 26, and a secondary outlet 52 is located slightly above inlet 50, inlet 50 being intermediate the top and bottom of the expansion tank. A tuning port 54 with a cap 56 is located slightly above secondary outlet 52. A pressure relief valve 58 is provided near the top of expansion tank 26, and a fill port 60 is provided at the top of the expansion tank.

A finned tube 62, which acts as a radiator, is located beneath collector 12, and is coupled to secondary outlet 52 in expansion tank 26. The bottom end of finned tube 62 terminates in a U-shaped trap 64, which enters return conduit 30 intermediate its ends. Trap 64 inhibits fluid from flowing from tube 62 into return conduit 30 except when the fluid is entering the tube at the top—otherwise, the fluid will be stagnant in tube 62 and its liquid level will be maintained at the same level as the liquid level 66 of the fluid in expansion tank 26.

As illustrated in FIG. 2A, collector fluid is forced upwardly through conduit 24 when pump 22 is operating (see FIG. 1). The collector fluid flows upwardly through solar collector 12, completely filling the available fluid volume of the collector. During normal daylight operation, as illustrated in FIG. 2A, the liquid level 66 of collector fluid in expansion tank 26 is below inlet 50 so that the collector fluid spills out of inlet 50 into expansion tank 26. When sunlight is no longer available, pump 22 stops, and the fluid is no longer forced upwardly through conduit 24. Because inlet 50 is above the liquid level 66 in expansion tank 26, the collector fluid cannot flow backwardly from the expansion tank through collector 12. Such backflow, called "backsiphoning" because it results from a siphoning action, would cause the collector fluid to flow through the collector to cool the collector fluid and thereby operate the system in reverse, cooling the water in storage tank 38 (see FIG. 1).

As illustrated in FIG. 2B, excessive heating of the collector fluid will cause the liquid level 66 of the fluid to rise. Eventually, liquid level 66 will reach the level of secondary outlet 50. When this occurs, collector fluid will begin to flow into finned tube 62, re-entering return conduit 30 through trap 64. Finned tube 62, which is located below collector 12 so that it is shaded from the sun, will dissipate heat from the collector fluid, and the collector fluid re-entering return conduit 30 through trap 64 will be cooled significantly. This cooling effect replaces that normally provided by heat exchanger 32, preventing the temperature of the cooling fluid from reaching a preselected value. By limiting the maximum temperature of the collector fluid, the fluid is not generally lost through pressure relief valve 58, and the collector fluid does not reach temperatures which could be damaging to polymeric seals and other elements in the system.

The maximum operating temperature of the system is established as illustrated in FIG. 2C. Initially, the system is overfilled with collector fluid through fill port 60. The cap 56 on tuning port 54 is removed, and the system is operated without providing a heat loss at heat exchanger 32. The system is allowed to heat up, and the temperature of the fluid is closely monitored. The level 66 of the collector fluid in expansion tank 26 rises, until it eventually reaches tuning port 54, where it is allowed to spill out. Continued spillage of the collector fluid is permitted until the collector fluid reaches the desired maximum temperature, usually in the neighborhood of 170° F. Cap 56 is then reapplied to tuning port 54.

When the collector fluid is thereafter heated to within a few degrees of the preselected temperature, the fluid level reaches secondary outlet 50, causing a portion of the fluid to enter finned tube 62 and be cooled. As a result, finned tube 62 will dissipate heat from the collector fluid starting just below the maximum temperature, preventing the temperature of the collector fluid from substantially exceeding the desired maximum temperature. However, at temperatures more than a few degrees below the desired maximum, the collector fluid does not enter finned tube 62 at all, and the system operates without unwanted secondary heat dissipation.

An additional problem which may occur in solar collection systems of the type described herein is a failure of the pump. As illustrated in FIG. 2A, backsiphoning is prevented under normal circumstances by the fact that inlet 50 to expansion tank 26 is above the liquid level 66 of the collector fluid in the tank. This is desirable when sunlight is not available, but in the event of a pump failure with sunlight available, such stagnation is undesirable. The collector fluid located in collector 12 will be heated to a very significant degree, while the remaining collector fluid is not. The vapor pressure of the collector fluid within the expansion tank 26 will thus rise significantly, even though only a part of the collector fluid is being excessively heated, and the fluid will escape from the system through pressure relief valve 58. The preferred embodiment of the present invention prevents this undesirable situation by placing inlet 50 slightly below secondary outlet 52. In the event of pump failure in the presence of sunlight, the liquid will expand until the liquid level 66 reaches collector exit 50. At this point, a continuous liquid path will be provided. Because of differential heating, the fluid will slowly migrate through the system, through the disabled pump, and the heat input will be distributed throughout the collector fluid.

While a preferred embodiment of the present invention has been illustrated in detail, it is apparent that modifications and adaptations of that embodiment will occur to those skilled in the art. It is to be expressly understood that such modifications and adaptations are within the spirit and scope of the present invention, as set forth in the following claims.

What is claimed is:

1. A fluid cycling system for a solar collector having a fluid entrance, a fluid exit and a maximum operating temperature, said system comprising:

a vertically extending expansion tank having an inlet coupled to the fluid exit and located intermediate the top and bottom of the expansion tank, a primary outlet below the tank inlet and a secondary outlet located relatively above the primary outlet;

a return conduit coupling the primary outlet to the fluid entrance;

a radiator coupling the secondary outlet to an intermediate portion of the return conduit; and a fluid occupying the solar collector and the return conduit and having a liquid volume so that in the absence of solar input to the collector the level of liquid in the tank is below the inlet, and at approximately the maximum operating temperature the liquid volume reaches the secondary outlet so that a portion of the liquid passes through the radiator to dissipate heat and prevent the temperature of the fluid from exceeding the maximum operating temperature.

2. The system of claim 1 wherein the secondary outlet is located relatively above the tank inlet to provide a continuous liquid path in the event of pump failure to facilitate fluid migration.

3. The system of claim 1 and additionally comprising a tuning port in the expansion tank located slightly above the secondary outlet so that the appropriate liquid volume can be established by operating the system at the maximum temperature with the tuning port open to allow excess liquid to escape from the system, after which the tuning port is closed.

4. The system of claim 1 wherein the radiator comprises a finned tube underlying the solar collector so that the tube is substantially shaded from the sun by the solar collector.

5. The system of claim 4 wherein the finned tube includes a trap prior to joining the return conduit so that cooled fluid enters the return conduit only when hot fluid enters the finned tube.

6. A fluid cycling system for a solar collector having a fluid entrance, a fluid exit, and a maximum operating temperature, said system comprising:

a vertically extending expansion tank having an inlet coupled to the collector exit and located intermediate the top and bottom of the expansion tank, a primary outlet below the tank inlet, a secondary outlet above the inlet, and a tuning port slightly above the secondary outlet;

a return conduit coupling the primary outlet to the fluid entrance;

a finned tube coupling the secondary outlet to an intermediate portion of the return conduit, and including a trap prior to joining the return conduit; and a fluid occupying the solar collector and the return conduit, the quantity of said fluid being determined by operating the system at its maximum operating temperature with the tuning port open to allow excess liquid to escape from the system, after which the tuning port is closed, so that in the absence of solar input to the collector the level of liquid in the tank is below the inlet, and at approximately the maximum operating temperature the liquid volume reaches the secondary outlet so that a portion of the liquid passes through the finned tube to dissipate heat and prevent the temperature of the fluid from exceeding the maximum operating temperature.

7. The system of claim 1 or 6 wherein the fluid exit is located at the top of the solar collector, and the expansion tank is located proximate the top of the solar collector.

8. The system of claim 1 or 6 and additionally comprising a pump to force the collector fluid through the solar collector to the fluid exit.

9. The system of claim 8 and additionally comprising a photovoltaic panel for generating electricity in the presence of sunlight, and means for electrically coupling the photovoltaic panel to the pump to drive the pump only in the presence of sunlight.

10. The system of claim 1 or 6 wherein the return conduit includes a heat exchange section.

11. The system of claim 10 wherein the heat exchange section is coupled to a hot water storage tank.

* * * * *